Sept. 3, 1935. R. T. BOWLING 2,013,026
BRIQUETTE MACHINE
Filed Aug. 5, 1933
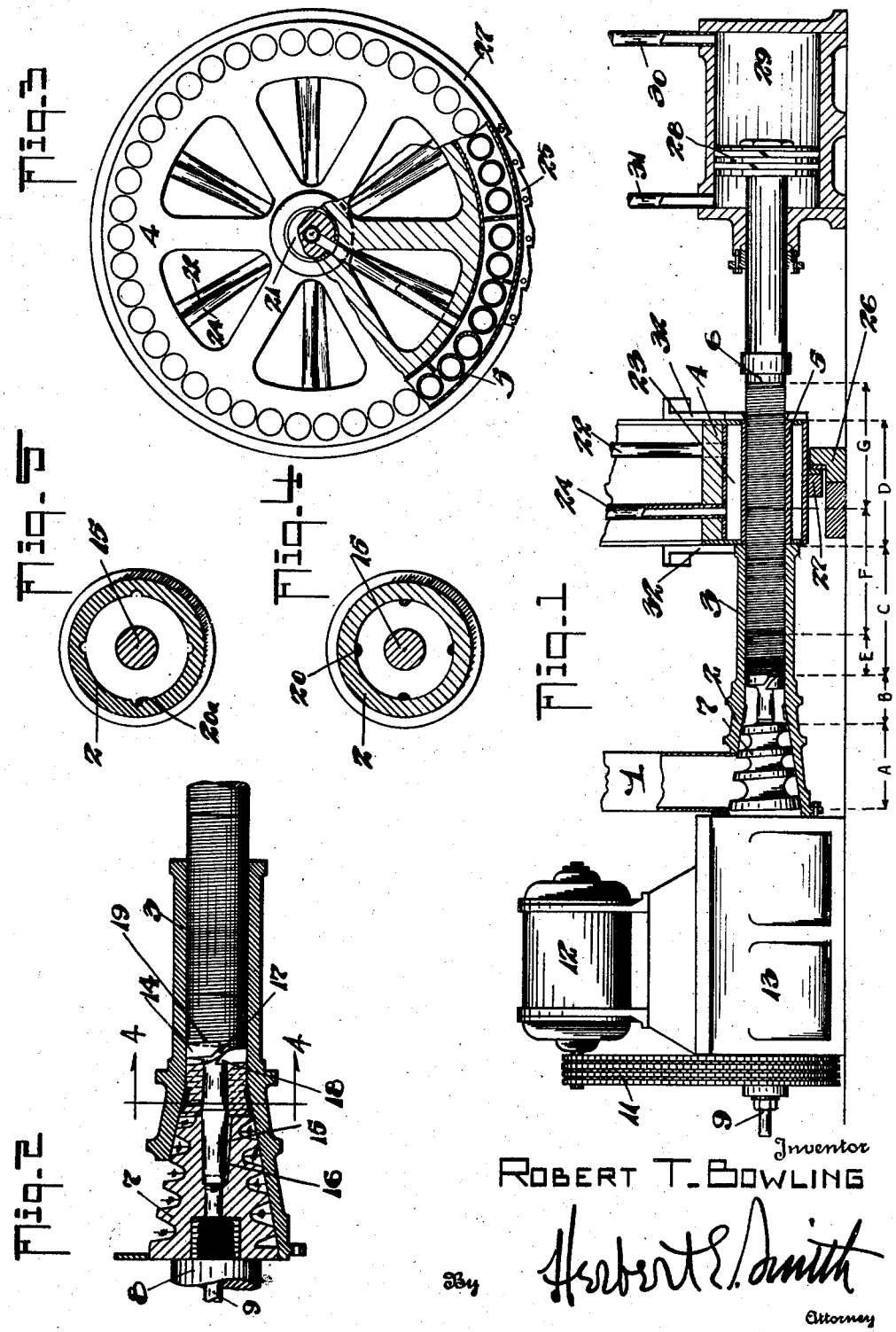
Inventor
ROBERT T. BOWLING
By Herbert E. Smith
Attorney Patented Sept. 3, 1935

2,013,026

UNITED STATES PATENT OFFICE 2,013,026

BRIQUETTE MACHINE

Robert T. Bowling, Lewiston, Idaho, assignor to Wood Briquettes, Inc., Lewiston, Idaho Application August 5, 1933, Serial No. 683,851

8 Claims. (Cl. 25—69)

This invention relates to improvements in briquette machines for presses for molding or pressing solid cylindrical briquettes from wood fiber or sawdust, comminuted shavings and similar materials. In carrying out my invention I employ a tapered feed screw which presses the material in a compression chamber, and a spaced spiral die-head, revolving with the screw, presses the material into a second compression chamber, and mold, against the yielding resistance of a hydraulic die. A solid cylindrical briquette is projected into a mold, a number of which are carried by a mold carrier, the molds being successively adapted to register with the feed screw and the yielding die for a predetermined idle period of the mold carrier, and the feed screw is operated while the carrier is stationary. A completed briquette makes one complete revolution with the rotary carrier, during which the briquette is cooled, and then the completed briquette is projected or ejected from the mold by a core from which another briquette is fashioned.

The briquette is fashioned in a solid cylinder, of a continuous spiral layer having a width equal to the radius of the briquette, and due to heat and generated, internal friction, both internally and externally of the briquette, the latter is fashioned as a solid, homogeneous, cylinder with a glazed and hardened exterior surface.

Figure 1 is a side view, partly in elevation and partly in section, of the machine, showing a core, and a briquette, the latter being ejected from its mold.

Figure 2 is an enlarged, fragmentary, sectional view of parts in Figure 1, showing a core being pressed in the first compression chamber and the stock in the second compression chamber, and also indicating the length of a briquette.

Figure 3 is a side view partly in elevation and partly in section showing the mold carrier.

Figure 4 is a detail, sectional view at line 4—4 of Figure 2 and Figure 5 is a similar view of a modification of the invention.

In Figure 1 the space A indicates the feeding and compressing space; the space B is the first compression chamber; space C is the second compression chamber; D is the mold; the letters E and F show the length of the laminated core; and G indicates the length of a completed briquette.

The comminuted vegetable fiber is fed through a chute or hopper 1 to the tapered drum 2, which forms the feeding and compressing space A, and this drum terminates in a cylindrical barrel 3. A rotary mold carrier 4 is disposed transversely of the tapered drum, and in the carrier are mounted near its periphery a number of molds 5 that are adapted to successively aline with the extension or barrel 3 and receive the stock from the barrel or second compression chamber.

A yielding, reciprocable die 6 is axially alined with the drum and barrel and located at the opposite side of the mold carrier, it being understood that the carrier intermittently turns between the barrel 3 and the die 6 to sever a briquette G from the stock, and that at the time the briquette is severed, the die 6 is out of the way.

Within the feed drum is located a tapered feed screw 7 that compresses the material in space A and compresses and forms the core in the first compression chamber B, which core is indicated in Fig. 2.

The tapered feed screw is provided with a shaft 8 which is supported in suitable bearings and is revolved through the driving belt 11 of the motor 12. Within the case 13 are provided suitable bearings for the screw shaft 8, these bearings also taking care of the thrust caused by the pressure of the screw on the material passing through the machine.

In front of the tapered feed screw is located a circular die-head 14 in the shape of a screw thread, and spaced from the feed screw to form the first compression space or chamber B, and this die-head is fashioned with a spindle 15 that is keyed at 16 in a socket of the screw so that the screw and the die-head revolve together. The spiral or screw-thread die-head is fashioned with a diagonally extending slot 17 that extends from the outer periphery of the circular head to the spindle at the rear of the head, while at the front of the head the slot extends approximately to the axial center of the die-head. The walls of the slot diverge from rear to front of the head, and the rear face of the head is fashioned with an off-set, radially extending, cutting edge 18, while the front face of the head is fashioned in cam or spiral formation with the highest point of the cam at 19, thus forming a presser face at the front of the head.

Through the shaft 8, a smaller shaft 9 is threaded into the spindle 15 to securely draw the circular die-head 14 into the tapered feed screw from the outside end without any necessity of tearing down the machine in order to assure tightness in the relation of these two parts.

The tapered screw compresses the material, against the inner or rear face of the die-head, to form a core in the first compression chamber B, and this core is held against rotary movement by means of an annular series of spaced longitudinal ribs 20 in Figure 4, or by a similar series of grooves 20a in Figure 5. As the core is formed by compression of the material in this chamber, the material is banked against the ribs, or locked in the grooves, of the wall of the chamber, thereby holding the core against rotation with the screw and the die-head.

From this stationary core, the cutting edge 18 of the revolving die-head 14 serves a continuous ribbon approximately the width of the radius of the head, and this ribbon is passed or conveyed through the diagonal slot of the die-head into the second compression C within the barrel 3. As the die head revolves, it "lays" the ribbon in a continuous, spiral lamination, or laminations, against the yielding die 6, to form the stock.

The die 6 is advanced up to the mold 5 to act as an abutment in the formation of the stock E, F, and as the die 6 retracts at a slower speed than the stock advances, all of the laminations between the die-head and the die are compressed to form a solid cylinder.

Due to compression and friction an internal heat is created in the core, stock, and die, which serves to bind the material into a homogeneous mass, and the heat generated by friction between the stock and the interior of the barrel 3, together with the friction of the moving stock against the wall of the barrel, glazes the exterior of the stock, thereby hardening its exterior surface, and providing the briquette with a hard protecting jacket.

When a length of stock has been pressed into the mold sufficient to form a briquette and also eject a briquette, the operation of the feed screw ceases, and the mold carrier revolves one step, to sever the contained briquette from the stock and free it from the ejected briquette. During the first complete revolution of the mold carrier all of the briquettes in the molds make a complete revolution with the carrier, then during the second, and succeeding revolutions of the carrier, the stock successively impinges against a briquette in a mold, while the carrier is idle, and presses the right end of the briquette against the die 6. In Figure 1 the die 6 is receding or retracting, and the briquette G is being forced to the right side of the carrier, where the briquette will be dropped. After dropping the briquette, the head 6 is again projected to the left to engage the outer or free end of the stock in the mold from which the first briquette has been ejected, and this operation is repeated as the carrier revolves intermittently, and as the feed screw also operates intermittently.

During the circular travel of a briquette in the carrier, the hot briquette is cooled by circulation of water around the molds, which carries off the heat from the briquettes and the molds. For this purpose the central shaft 21 of the mold carrier is provided with inlet and outlet, axially arranged conduits, and a water pipe 22 supplies water at one end of the shaft to a water chamber 23 that surrounds the molds, while an outlet pipe 24 carries the heated water from the cooling or water chamber back to the other conduit in the carrier shaft and the heated water is disposed of in suitable manner.

A rack ring 25 is indicated at the periphery of the mold carrier and suitable ratchet mechanism is employed with the ring for intermittently revolving the carrier.

Inasmuch as a pressure of approximately 20,000 tons is applied to the stock, core and briquette, while in the press, the friction created transmits a heavy strain against the bottom of the circular mold carrier, and this lateral strain is taken up by an arcuate shaped pressure plate 26, which is stationary, and an annular plate or ring 27 on the carrier, suitable wear plates being interposed between the revolving ring and the stationary or fixed plate, to compensate for wear.

The yielding die 6, which forms the abutment for the press forms the stem of a piston 28 that reciprocates in the cylinder 29, and pipes 30 and 31 provide for alternate admission and exit of fluid at opposite sides of the piston. Hydraulic pressure at the back of the piston projects the die to position to engage the stock or briquette, and the pressure is slowly released through pipe 30 to provide the yielding resistance of the die 6 to the press. This resistance may be increased to insure a more dense compression, or decreased to insure a less dense compression of the core, stock, and briquette.

After the briquette in the mold has been severed from the stock, its ends project slightly from the ends of the mold, and for the purpose of holding the briquette in its mold against longitudinal expansion before it is cooled and set, I provide a pair of retaining plates 32, one at each side of the carrier. These plates are of arcuate shape, and they may be employed as cutters to trim the ends of the briquettes. The ends of the briquettes ride against the inner faces of the plates as the carrier revolves, and the briquettes are thus held against expansion for a sufficient period of time to accomplish the purpose.

It will be noted that the barrel, extension, or second compression chamber, is of length to accommodate a stock the length of a briquette, and therefore sufficient stock is ready at all times to be pressed into the mold for the cutting or severing of a briquette. During the period when the screw is idle and the carrier is moving a step, the stock remains stationary, then as the carrier comes to a rest and the screw is revolved, the stock is projected into the next mold, under compression, and the friction of the stock against the wall of chamber 3 glazes and hardens the stock.

Having thus fully described my invention, what I claim as new and desire to secure by Letters Patent is:

1. In a briquette machine, the combination with a feed drum and a feed screw rotatable therein, and an extension of the drum, of a spaced die-head rigid with the screw and forming a compression chamber in front of the screw, a mold alined with the extension to receive a briquette, said die-head having a slot opening at opposite sides of the head, means at one side of the die-head for severing a ribbon from a core in the first compression chamber, and means at the other side of the die-head to compress said ribbon in spiral laminations in the extension.

2. In a briquette machine, the combination with a tapered drum having a cylindrical extension, of a tapered screw in said drum, a spaced spiral die-head having a slot and rigid with the screw, said die-head forming a compression chamber in front of the screw, means on one face of the die-head to sever a ribbon from a core in said chamber, and means on the other face of the die head to compress the ribbon in spiral laminations in the extension.

3. In a briquette machine, the combination with a tapered drum having a cylindrical extension and a tapered feed screw in said drum, of a spaced, spiral die-head having a diagonal slot and rigid with the screw, said die-head forming a compressing chamber in front of the screw, means within said chamber to prevent rotary motion of a core therein, means on one face of the die-head to sever a ribbon from said core, and means on the other face of the die-head to compress the ribbon in spiral laminations in the extension.

4. In a briquette machine, the combination with a tapered drum having a cylindrical extension and a tapered feed screw in the drum, of a spaced slotted die-head forming a single screw-thread and rigid with the screw, said die-head forming a compressing chamber in front of the screw, ribs on the wall of said chamber to prevent rotary motion of the core formed therein, means at one side of the die head to sever a ribbon from the core, and means on the other side of the die-head to compress said ribbon in spiral laminations in said extension.

5. In a briquette machine, the combination with a tapered drum having a cylindrical extension, and a tapered feed screw in the drum, of a spaced slotted die-head rigid with the screw and forming a compression chamber in front of the screw for a core, means in said chamber to prevent rotary motion of the core, a cutting edge at one side of the head to sever a ribbon, and a pressing surface at the other side of the head to compress the ribbon in spiral laminations in the extension.

6. In a briquette machine, the combination with means for compressing a core, of means for severing a continuous ribbon from said core, and means for compressing said ribbon in spiral laminations to form a solid cylindrical stock.

7. In a briquette machine, the combination with means for compressing a core, and means for retaining the compressed core against rotation, of rotary means for severing a continuous ribbon from said core, and means for compressing said ribbon into spiral laminations to form a solid cylindrical stock.

8. In a briquette machine, the combination with a feed drum and a feed screw rotatable therein, and a cylindrical barrel forming an extension of the drum, of a spaced round die-head forming a separating partition between the drum and the barrel, means in the separated drum-space to prevent rotation of a core therein, said die-head having a slot opening at its opposite sides, means on the drum-side of the die-head for severing a ribbon from the core, and means on the barrel-side of the die-head to compress said ribbon in spiral laminations.

ROBERT T. BOWLING.